United States Patent
Oomura

(10) Patent No.: US 7,699,738 B2
(45) Date of Patent: Apr. 20, 2010

(54) OIL PUMP STRUCTURE OF TRANSMISSION

(75) Inventor: Tomohiro Oomura, Fuji (JP)

(73) Assignee: Jatco Ltd., Fuji-shi (JP)

( * ) Notice: Subject to any disclaimer, the term of this patent is extended or adjusted under 35 U.S.C. 154(b) by 468 days.

(21) Appl. No.: 11/690,421

(22) Filed: Mar. 23, 2007

(65) Prior Publication Data

US 2007/0224062 A1    Sep. 27, 2007

(30) Foreign Application Priority Data

Mar. 24, 2006  (JP) .............................. 2006-083147

(51) Int. Cl.
| | |
|---|---|
| F16H 13/06 | (2006.01) |
| F16H 13/10 | (2006.01) |
| F16H 15/48 | (2006.01) |
| F01M 11/00 | (2006.01) |
| F16N 11/10 | (2006.01) |
| F16N 13/16 | (2006.01) |
| F04B 7/04 | (2006.01) |

(52) U.S. Cl. .................. 475/114; 184/6.28; 184/29; 417/493

(58) Field of Classification Search .................. 475/114; 74/606 R; 184/6.28, 26, 29; 417/490, 493
See application file for complete search history.

(56) References Cited

U.S. PATENT DOCUMENTS

| | | | |
|---|---|---|---|
| 4,889,621 A | 12/1989 | Yamada et al. | |
| 5,211,262 A | 5/1993 | Akiyama | |
| 5,660,531 A | 8/1997 | Merkle et al. | |
| 5,878,632 A | 3/1999 | Hübler et al. | |
| 6,089,842 A * | 7/2000 | Dehmel et al. | 418/171 |
| 6,189,655 B1 * | 2/2001 | Scheib et al. | 184/6.12 |
| 7,192,257 B2 * | 3/2007 | Becker et al. | 417/79 |
| 2004/0213688 A1 | 10/2004 | Tanikawa et al. | |

FOREIGN PATENT DOCUMENTS

| | | |
|---|---|---|
| DE | 44 36 505 A1 | 4/1996 |
| EP | 0 737 812 A1 | 10/1996 |
| JP | 61-006459 | 1/1986 |
| JP | 2-35904 A | 2/1990 |

* cited by examiner

Primary Examiner—Tisha D Lewis
(74) Attorney, Agent, or Firm—Foley & Lardner LLP

(57) ABSTRACT

In an oil pump structure of an automatic transmission using a torque converter, a hydraulic pressure chamber is defined by a pump housing and a pump cover, to rotatably accommodate therein inner and outer rotors. First and second inflow ports respectively communicating with an oil strainer and a control valve are formed in the outside surface of the pump cover separately from each other. First and second oil inflow passages communicating with the respective inflow ports, a merged-flow portion that downstream portions of the first and second oil inflow passages are merged with each other, a downstream-side oil distribution channel intercommunicating a downstream side of the merged-flow portion and the hydraulic pressure chamber, are formed in at least one of the pump housing and the pump cover.

6 Claims, 6 Drawing Sheets

FIG.2

|  | H/C | 3-5R/C | L/C | 2-6/B | L&R/B |
|---|---|---|---|---|---|
| 1ST |  |  | ○ |  | ○ |
| 2ND |  |  | ○ | ○ |  |
| 3RD |  | ○ | ○ |  |  |
| 4TH | ○ |  | ○ |  |  |
| 5TH | ○ | ○ |  |  |  |
| 6TH | ○ |  |  | ○ |  |
| REVERSE |  | ○ |  |  | ○ |

OIL PUMP STRUCTURE OF TRANSMISSION

TECHNICAL FIELD

The present invention relates to an oil pump structure suitable for an automotive automatic transmission, and specifically to the improvement of a fluid-flow passage structure of an automotive transmission oil pump.

BACKGROUND ART

As is generally known, in an automatic transmission mounted on an automotive vehicle, hydraulic pressure used to engage (apply) or disengage (release) each of friction elements, such as clutches and band brakes, and hydraulic pressure used for lubrication of sliding/moving transmission parts with lubricating oil are generated by means of an oil pump. In the automotive automatic transmission, hydraulic pressure has to be generated and supplied by the oil pump, irrespective of whether the vehicle is running or in its stopped state. Thus, in an automatic transmission using a torque converter, an oil pump is laid out in the rear of a torque-converter pump impeller, which is rotated in synchronism with rotation of an engine crankshaft. An inner rotor of the oil pump is fixedly connected to the pump impeller so as to always drive the oil pump during rotation of the crankshaft.

Such a technology related to a pump structure of an oil pump laid out between a torque converter and a transmission mechanism has been disclosed in Japanese Patent Provisional Publication No. 2-35904 (hereinafter is referred to as "JP2-35904").

Referring now to FIGS. 7-8, there is shown the oil pump structure disclosed in JP2-35904. As can be seen from the simplified drawing of FIG. 7, an oil pump 201 is laid out between a torque converter 211 and a transmission mechanism 212. A pump body 202 is laid out or installed on one side facing a pump impeller of torque converter 211, whereas a pump cover 203 is laid out or installed on the opposite side facing transmission mechanism 212. Pump body 202 and pump cover 203 are integrally connected to each other to define therein a pumping chamber 204. An inner rotor and an outer rotor are operably accommodated in pumping chamber 204. A separate plate (not shown) is interleaved between pump body 202 and pump cover 203 so as to ensure a high sealing performance of fluid passages formed in oil pump 201. As shown in FIG. 8, one end of an oil passage formed in pump body 202 communicates with a discharge portion (an outlet port) 222 of an oil strainer 221. Lubricating oil supplied to sliding/moving transmission component parts in transmission mechanism 212 is sucked through a suction portion (an inlet port) 223 of strainer 221. The sucked oil is filtered out through an oil filter 224 of strainer 221. The filtered-out oil flows through discharge portion 222 of strainer 221 via a suction port 202a into pump body 202, that is, into the space defined between the inner and outer rotors for pumping action. On the other hand, working oil drained from each of hydraulic servos for friction elements such as clutches and band brakes is exhausted from a valve body (exactly, a control valve body) 231 into an oil passage 214 formed in a transmission case 213 of transmission mechanism 212, and then flows through discharge portion 222 of strainer 221 via suction port 202a into pump body 202.

That is to say, as can be seen from the cross section of FIG. 8, the discharge portion 222 of strainer 221 has a fluid-flow communication opening 222b communicating with the oil passage 214 of transmission case 213 and a fluid-flow communication opening 222a communicating with the suction port 202a of pump body 202. Thus, oil, which is used as lubricating oil for transmission mechanism 212 and discharged from the discharge portion 222 of strainer 221, and oil, which is drained from each of hydraulic servos and directed to pump body 202, are merged with each other at the discharge portion 222 of strainer 221 (that is, into the space defined between the above-mentioned two fluid-flow communication openings 222a-222b). The merged oil flows through suction port 202a into the pumping chamber of pump body 202.

To provide leakproof oil seals and to prevent oil leakage, a pair of O-ring seals 225, 225 are respectively interleaved between the opening end of oil passage 214 of transmission case 213 and the first fluid-flow communication opening 222b of discharge portion 222 of strainer 221 and between the second fluid-flow communication opening 222a of discharge portion 222 of strainer 221 and the suction port 202a of pump body 202.

Additionally, in the oil pump structure disclosed in JP2-35904, as shown in FIG. 7, generally, the diameter of the outer circumference of pump body 202 is dimensioned to be greater than that of pump cover 203. The oil inflow port, i.e., suction port 202a (see FIG. 8) is formed in the outer peripheral portion of pump body 202, further projected radially from the outer circumference of pump cover 203. This is because the subjective component part of oil pump 201 is the pump body 202, which also serves as an end cover of transmission mechanism 212. That is, oil pump 201 is constructed by integrally connecting pump body 202 onto the end face of transmission mechanism 212, and therefore major structural portions of oil pump 201, for example, pumping chamber 204 and suction port 202a tend to be all provided in pump body 202 rather than pump cover 203.

SUMMARY OF THE INVENTION

According to the oil pump structure disclosed in JP2-35904, as best seen in FIG. 8, oil delivered from the oil strainer (hereinafter is referred to as "lubricating oil"), and oil exhausted from the control valve body (hereinafter is referred to as "return oil") are merged with each other at the discharge portion of the strainer, that is, into the space defined between the above-mentioned two fluid-flow communication openings 222a-222b, and then flows into the suction port of the pump body. Thus, there are the following drawbacks.

Within the discharge portion of the oil strainer, "lubricating oil" discharged from the oil strainer is blended with or added to "return oil" exhausted from the control valve body through the oil passage formed in the transmission case. As can be appreciated from the cross section of FIG. 8, the cross-sectional area of oil passage 214 of transmission case 213 through which the return oil (drain oil) flows, that is, the oil-passage cross section before merging is equal to the cross-sectional area of each of oil passages of strainer 221 and pump body 202, that is, the oil-passage cross section after merging. Thus, after the lubricating oil and the return oil (drain oil) have been merged into the discharge portion 222 of strainer 221, the flow velocity of the merged oil flow tends to be remarkably increased. This leads to the problem of the increased flow resistance that impedes the flow of oil flowing through the oil passage after merging. As a result of this, the fuel consumption rate is increased. Additionally, due to the increased oil flow velocity, there is an increased tendency for air to be sucked into the interior space of the pump through sealing portions, concretely, O-ring retaining grooves for O-ring seals 225. This leads to another problems, such as a fall in hydraulic pressure produced by the pump, and generation of noise. One way to prevent the flow velocity after merging from being increased, is to increase the flow passage area after merging, namely, the cross section of the discharge portion 222 of strainer 221, the cross section of suction port 202a of pump body 202, and the cross section of the subsequent oil passage communicating with the pump-body suction port 202a. Concretely, increasing of the cross section of each of the oil passages after merging means an increase in the cross section of the junction (the fitting portion) between oil passage 214 of transmission case 213 and fluid-flow communication opening 222b of discharge portion 222 of strainer 221 and an increase in the cross section of the junction (the fitting portion) between fluid-flow communication opening 222a of discharge portion 222 of strainer 221 and suction port 202a of pump body 202. As a result, the area (the radial dimension) of the sealing section of the perimeter of each of the openings of the junctions (the fitting portions) must be increased. To ensure a high sealing performance, the number of fastening bolts used to interconnect the component parts must be increased. This leads to another problems, such as the increased number of parts related to the sealing device, higher system installation time and costs. Furthermore, the increase in the cross section of each of the junctions means a lower rigidity of each of the junctions, in other words, a higher possibility of oil leakage. As a countermeasure against such a lower rigidity of the junction, the pitch between the two adjacent fastening bolts must be narrowed. This also means the increased number of component parts constructing a hydraulic system, and higher system installation time and costs.

In order to increase the cross section of the pump-body oil passage communicating with suction port 202a, it is effective to enlarge the axial length of pump body 202, that is, the axial dimension of oil pump 201. However, as can be seen from the schematic diagram of FIG. 7, the outer peripheral portion of pump body 202 formed therein with suction port 202a is configured or arranged to face in close proximity to the axially radially-curved convex backward face of the pump impeller of torque converter 211. Thus, there is a slight axial clearance space defined between torque converter 211 and oil pump 201. Suppose that the axial dimension of oil pump 201 is enlarged. In such a case, to avoid the undesired interference between oil pump 201 and torque converter 211, the axial dimension of the overall transmission system must be increased.

It is, therefore, in view of the previously-described disadvantages of the prior art, an object of the invention to provide an oil pump structure of a transmission capable of ensuring an adequate fluid passage area of an oil passage through which oil flows into an oil pump, while achieving a compactification of the pump, in particular, a reduced axial dimension of the outer peripheral portion of the pump.

In order to accomplish the aforementioned and other objects of the present invention, an oil pump structure of a transmission comprises a pump housing installed on the transmission and having a hydraulic pressure chamber, inner and outer rotors rotatably accommodated in the hydraulic pressure chamber, and a pump cover attached to the pump housing for hermetically covering the hydraulic pressure chamber formed in the pump housing to hold the inner and outer rotors in the pump housing, wherein a first inflow port communicating with an oil strainer and a second inflow port communicating with a control valve are formed in an outside surface of the pump cover separately from each other, and wherein a first oil inflow passage communicating with the first inflow port and a second oil inflow passage communicating with the second inflow port, a merged-flow portion that a downstream portion of the first oil inflow passage and a downstream portion of the second oil inflow passage are merged with each other, a downstream-side oil distribution channel intercommunicating a downstream side of the merged-flow portion and the hydraulic pressure chamber, are formed in at least one of the pump housing and the pump cover. It is preferable that a flow passage area of the downstream side of the merged-flow portion is dimensioned to be greater than or equal to a summed value of flow passage areas of the first and second inflow ports. Preferably, the downstream-side oil distribution channel, communicating with the downstream side of the merged-flow portion, may be configured as an integrated channel formed in both of the pump housing and the pump cover. It is preferable that the pump housing is located in close vicinity to a torque converter of the transmission. Preferably, the first and second oil inflow passages may be merged with each other at an acute angle at the merged-flow portion. More preferably, the angle between the flow direction of working oil flowing through the first oil inflow passage and the flow direction of working oil flowing through the second oil inflow passage is acute. It is preferable that the outside diameter of the pump housing and the outside diameter of the pump cover are dimensioned to be substantially identical to each other, and additionally the outer circumference of the pump housing and the outer circumference of the pump cover are bolted together to provide metal-to-metal sealing surfaces, which form a virtually leakproof seal.

The other objects and features of this invention will become understood from the following description with reference to the accompanying drawings.

BRIEF DESCRIPTION OF THE DRAWINGS

FIG. 2 is a clutch- and band-brake-application chart of each of friction elements employed in the automatic transmission of FIG. 1.

DESCRIPTION OF THE PREFERRED EMBODIMENTS

Figure 1:
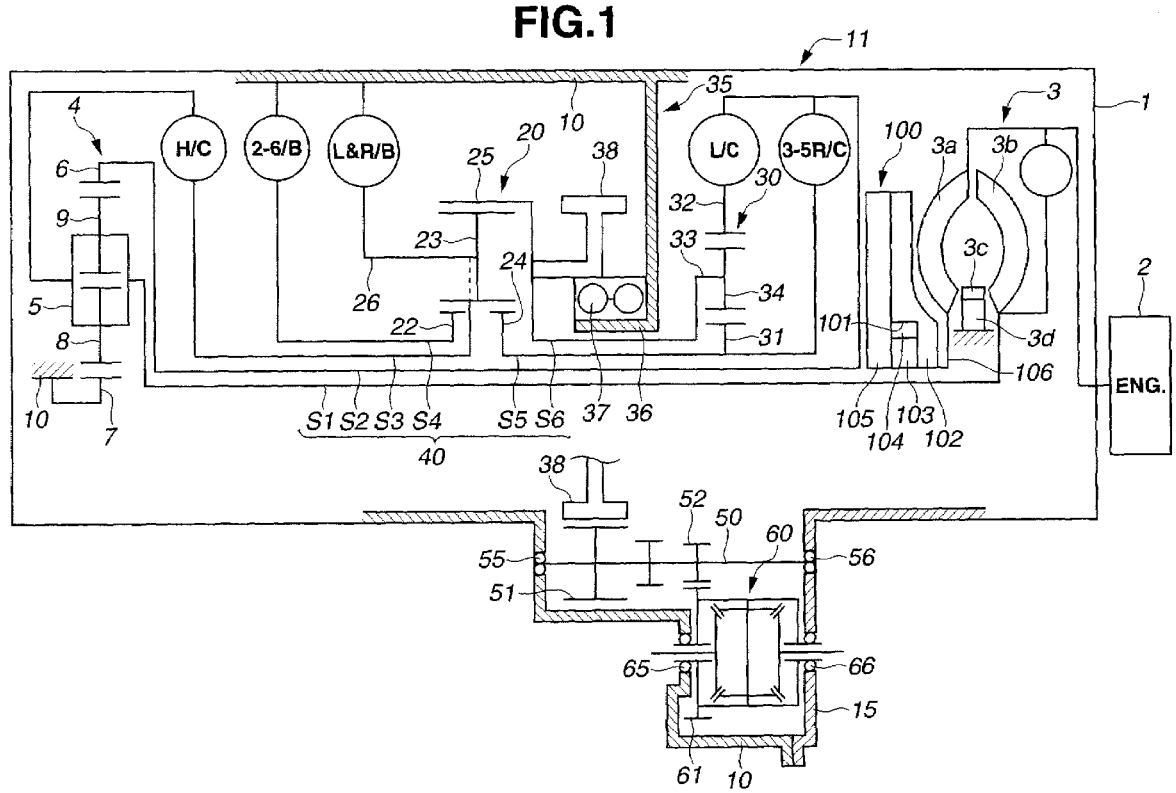
FIG. 1 is a skeleton diagram illustrating an automatic transmission to which an oil pump structure of an embodiment is applied.

Referring now to the drawings, particularly to FIG. 1, the oil pump structure of the embodiment is exemplified in an automotive automatic transmission 1, which is comprised of three basic parts, namely a torque converter 3, and planetary-gear systems (described later) included in a transmission mechanism 11. Automatic transmission 1 is connected to an engine 2 and mounted on an automotive vehicle (not shown). Torque converter 3 passes the engine power to the planetary-gear systems.

Torque converter 3 is comprised of a pump impeller 3a, a turbine runner 3b, a one-way clutch 3d, and a stator 3c. During operation of engine 2, the engine power is transmitted to pump impeller 3a. Turbine runner 3b is located to be opposed to pump impeller 3a for power transmission to a first shaft S1. Stator 3c is located between pump impeller 3a (the driving member) and turbine runner 3b (the driven member). Stator 3c is mounted on one-way clutch 3d, which permits stator 3c to run free when the driving and driven torque members 3a-3b are turning at about the same speed. Conversely when torque increase takes place, stator 3c stops and acts as a reactor. An oil pump 100 is located near the backward face (i.e., the axially radially-curved convex backward face of pump impeller 3a) of torque converter 3, facing apart from engine 2. Pump impeller 3a is connected to oil pump 100, exactly, an inner gear rotor 103 (described later) of oil pump 100, so that part of the engine power is transmitted to the inner gear rotor to produce hydraulic pressure.

The engine power input into torque converter 3 is input into transmission mechanism 11. Transmission mechanism 11 is comprised of a plurality of shafts S1 to S6, planetary-gear systems 4, 20, and 30, and a plurality of friction elements such as clutches and band brakes. In the shown embodiment, planetary-gear system 4 is a double-pinion planetary gearset, planetary-gear system 20 is a single-pinion planetary gearset, and planetary-gear system 30 is a single-pinion planetary gearset.

Concretely, the engine power is transmitted from torque converter 3 via the first shaft S1 into a planet carrier 5 of the double-pinion planetary gearset 4. Double-pinion planetary gearset 4 is comprised of carrier 5, a ring gear 6, a sun gear 7 fixedly connected to a transmission case 10 of transmission mechanism 11, an inside pinion gear 8 in meshed-engagement with sun gear 7, and an outside pinion gear 9 in meshed-engagement with ring gear 6. Inside and outside pinion gears 8 and 9 are meshed with each other. Carrier 5 contains the shafts upon which the respective pinion gears 8-9 turn.

Ring gear 6 is connected to the second shaft S2, which shaft is configured to hermetically cover the outer periphery of the first shaft S1 in such a manner as to pass through the central space of a substantially cylindrical-hollow main-shaft output gear 38 (described later) and to extend toward engine 2. Carrier 5 is connected via a high clutch H/C to the third shaft S3, which shaft is configured to hermetically cover the outer periphery of the second shaft S2 and extends toward engine 2. One end of the third shaft S3 is connected to high clutch H/C, while the opposite end of the third shaft S3 is connected to a planet carrier 26 of single-pinion planetary gearset 20. Carrier 26 contains the shaft upon which a pinion gear 23 turns. Carrier 26 is connected via a low-and-reverse brake L&R/B to transmission case 10.

Single-pinion planetary gearset 20 is comprised of a first sun gear 22, pinion gear 23, a second sun gear 24, a ring gear 25, and planet carrier 26. The second sun gear 24 is installed on the side of single-pinion planetary gearset 20 facing engine 2, whereas the first sun gear 22 is installed on the opposite side of single-pinion planetary gearset 20 facing apart from engine 2. The first sun gear 22, the second sun gear 24, and ring gear 25 are all in meshed-engagement with pinion gear 23.

The first sun gear 22 extends in the direction opposite to engine 2, and is connected to the fourth shaft S4, which shaft is configured to hermetically cover the outer periphery of the third shaft S3. The fourth shaft S4 is connected via a 2-6 brake 2-6/B to transmission case 10. The second sun gear 24 is configured to pass through the central space of the substantially cylindrical-hollow main-shaft output gear 38 and to extend toward engine 2. The second sun gear 24 is connected to the fifth shaft S5, which shaft is configured to hermetically cover the outer periphery of the second shaft S2. The fifth shaft S5 is connected via a 3-5 reverse clutch 3-5R/C to both of the second shaft S2 and a low clutch L/C.

Single-pinion planetary gearset 30 is mounted on the outer periphery of the fifth shaft S5 and located between the substantially cylindrical-hollow main-shaft output gear 38 and 3-5 reverse clutch 3-5R/C in the axial direction. Single-pinion planetary gearset 30 is comprised of a central sun gear 31, a ring gear (an internal gear) 32, a planet carrier 33, and a pinion gear 34. Sun gear 31 is connected to the fifth shaft S5. Pinion gear 34 is in meshed-engagement with both of sun gear 31 and ring gear 32. Pinion gear 34 is rotatably supported by carrier 33.

Ring gear 32 is connected via low clutch L/C to the second shaft S2. Carrier 33 is connected to the sixth shaft S6, which shaft is configured to hermetically cover the outer periphery of the fifth shaft S5 in such a manner as to pass through the central space of the substantially cylindrical-hollow main-shaft output gear 38 and to extend toward ring gear 25 of single-pinion planetary gearset 20. The sixth shaft S6 is connected to ring gear 25. As can be seen from the cross section indicated by the left-hand diagonal shading (or the upper hatching section) in FIG. 1, a bearing-support partition wall structure 35, formed integral with transmission case 10 in such a manner as to substantially radially extend from the inner wall of transmission case 10, is located between two single-pinion planetary gearsets 20 and 30. Bearing-support partition wall structure 35 is integrally formed at its central portion with a cylindrical bearing support 36, which axially extends along the outer periphery of the sixth shaft S6. The inner race of a bearing 37 is press-fitted onto the outer periphery of bearing support 36. Main-shaft outer gear 38, connected to ring gear 25, is supported on the outer race of bearing 37. As can be seen from the skeleton diagram of FIG. 1, in the shown embodiment, transmission mechanism 11 has a multiple shaft structure that the first, second, third, and fourth shafts S1, S2, S3, and S4 are coaxially arranged and overlap each other, in that order. Transmission mechanism 11 also has a multiple shaft structure that the first, second, fifth, and sixth shafts S1, S2, S5, and S6 are coaxially arranged and overlap each other within the cylindrical bearing support 36, in that order. Shafts S1 to S6 are collectively referred to as "main shaft 40".

The power from engine 2 is converted into a desired speed (in other words, a desired torque) by way of a suitable combination of clutch-engagements/clutch-disengagements of high clutch H/C, low clutch L/C, and 3-5 reverse clutch 3-5R/C, and band-applications/band-releases of 2-6 brake 2-6/B, and low-and-reverse brake L&R/B. The converted speed is transmitted through main-shaft output gear 38 to an input gear 51 integrally formed on a countershaft 50.

The power transmitted to the input gear 51 is further transmitted via an output gear 52 integrally formed on countershaft 50 to a final gear 61 of a differential gear mechanism 60, and then delivered or distributed via differential gear mechanism 60 into left and right drive wheels (not shown). As can be seen from the lower hatching section corresponding to transmission case 10 indicated by the left-hand diagonal shading and the lower hatching section corresponding to a converter housing 15 indicated by the right-hand diagonal shading in FIG. 1, one axial end of countershaft 50 is rotatably supported on transmission case 10 by means of a bearing 55, while the other axial end of countershaft 50 is rotatably supported on converter housing 15 by means of a bearing 56. On the other hand, one bevel gear of differential gear mechanism 60 is rotatably supported on transmission case 10 by means of a bearing 65, while the other bevel gear of differential gear mechanism 60 is rotatably supported on converter housing 15 by means of a bearing 66.

Referring now to FIG. 2, there is shown the clutch- and band-application chart of each of friction elements, that is, high clutch H/C, 3-5 reverse clutch 3-5R/C, low clutch L/C, 2-6 brake 2-6/B, and low-and-reverse brake L&R/B. A desired gear position (or a desired transmission ratio) is achieved by means of a shift control device including a control valve 115 (described later) for automatic transmission 1. The shift control device is capable of automatically shifting to the desired gear position by selectively engaging (or applying) the friction elements via hydraulic pressure.

As seen in the clutch- and band-application chart of FIG. 2, when putting the transmission into the first-speed gear, low clutch L/C is engaged and low-and-reverse brake L&R/B is applied.

The second-speed gear is achieved by engaging low clutch L/C and by applying 2-6 brake 2-6/B. With the transmission in the second gear position, the first sun gear 22 and pinion gear 23 are held stationary with respect to transmission case 10 by applying 2-6 brake 2-6/B. With the second sun gear 24 meshed with pinion gear 23, the fifth shaft S5, connected to the second sun gear 24, is held stationary with respect to transmission case 10.

The third-speed gear is achieved by engaging 3-5 reverse clutch 3-5R/C and low clutch L/C.

The fourth-speed gear is achieved by engaging high clutch H/C and low clutch L/C.

The fifth-speed gear is achieved by engaging high clutch H/C and 3-5 reverse clutch 3-5R/C.

The sixth-speed gear is achieved by engaging high clutch H/C and by applying 2-6 brake 2-6/B. In a similar manner to the second-speed gear, with the transmission in the sixth gear position, the first sun gear 22 and pinion gear 23 are held stationary by applying 2-6 brake 2-6/B. And thus, the fifth shaft S5 is held stationary by the second sun gear 24 meshed with pinion gear 23.

The reverse gear position is achieved by engaging 3-5 reverse clutch 3-5R/C and by applying low-and-reverse brake L&R/B.

Returning to FIG. 1, the oil pump structure of the embodiment is explained hereunder. As seen from the skeleton diagram of FIG. 1, oil pump 100 is interposed between torque converter 3 and transmission mechanism 11.

Oil pump 100 is comprised of a pump housing 102 defining therein a hydraulic pressure chamber (a pumping chamber or a working chamber) 101, inner and outer gear rotors (simply, inner and outer rotors) 103-104 operably accommodated in hydraulic pressure chamber 101, and a pump cover 105 detachably attached to pump housing 102 in a manner so as to hermetically cover hydraulic pressure chamber 101. Inner rotor 103 is fitted or splined to a pump impeller hub 106 of pump impeller 3a of torque converter 3, so that inner rotor 103 is always driven during operation of engine 2 (exactly, during rotation of the engine crankshaft).

Inner rotor 103 has an outer toothed portion formed on its outer peripheral surface, whereas outer rotor 104 has an inner toothed portion formed on its inner peripheral surface. The outer toothed portion of inner rotor 103 and the inner toothed portion of outer rotor 104 are meshed with each other, while the axis of inner rotor 103 is eccentric to the axis of outer rotor 104. That is, in the shown embodiment, oil pump 100 is constructed by an eccentric-rotor type pump. In operation, inner rotor 103 is rotated, which causes outer rotor 104 to turn also. During rotation of inner and outer rotors 103-104, pumping action is made by way of a change in volumetric capacity in the clearance space (the gaps between the teeth) defined between the outer toothed portion of inner rotor 103 and the inner toothed portion of outer rotor 104.

Figure 7:
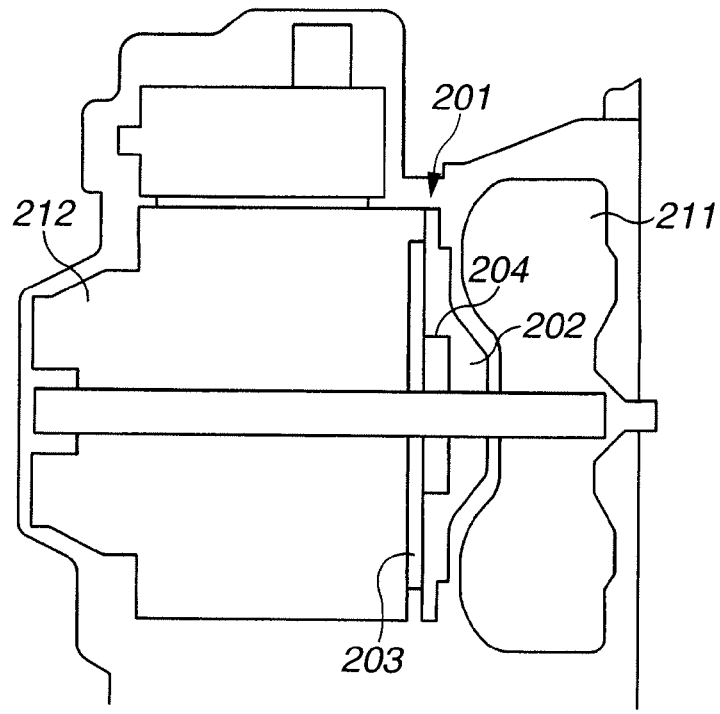
FIG. 7 is the simplified drawing explaining the prior art transmission oil pump structure.
Figure 8:
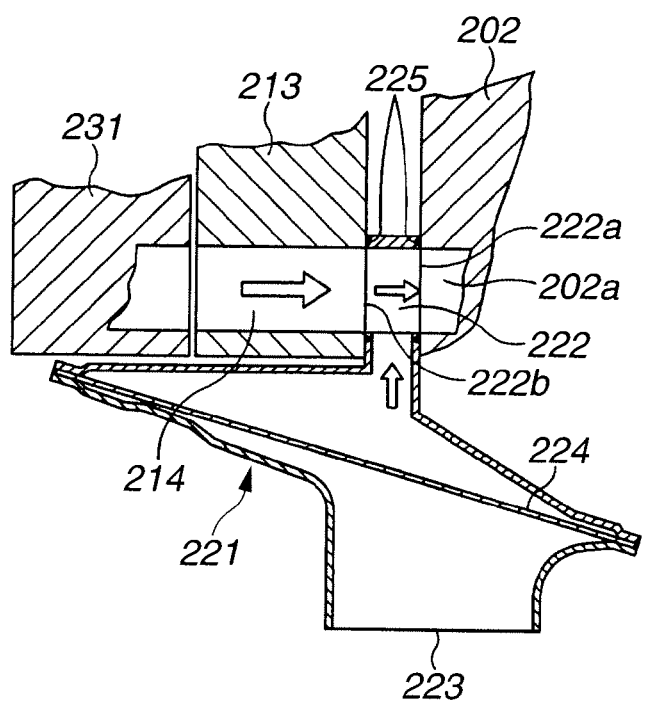
FIG. 8 is the partial cross section showing the oil passage structure near the suction port of the prior art transmission oil pump.

In the case of the oil pump structure of the embodiment, as seen in FIG. 1, the outside diameter of pump housing 102 and the outside diameter of pump cover 105 are dimensioned to be substantially identical to each other. Pump housing 102 and pump cover 105 are integrally connected to each other by joining the outer peripheral portions of pump housing 102 and pump cover 105 together by tightening pump-cover-and-pump-housing attaching bolts. Hitherto, the outside diameter of the pump body (the pump housing) was dimensioned to be greater than that of the pump cover (see FIG. 7), and also the oil inflow port, i.e., the suction port (see FIG. 8) was formed in the outer peripheral portion of the pump body, further projected radially from the outer circumference of the pump cover. As hereunder described in detail in reference to FIGS. 3 to 6, the oil pump structure of the embodiment greatly differs from that of the prior art, with respect to the flow passage structure (in particular, the oil inflow port structure) as well as the dimensional relationship between the pump-housing outside diameter (the pump-body outside diameter) and the pump-cover outside diameter.

Figure 3:
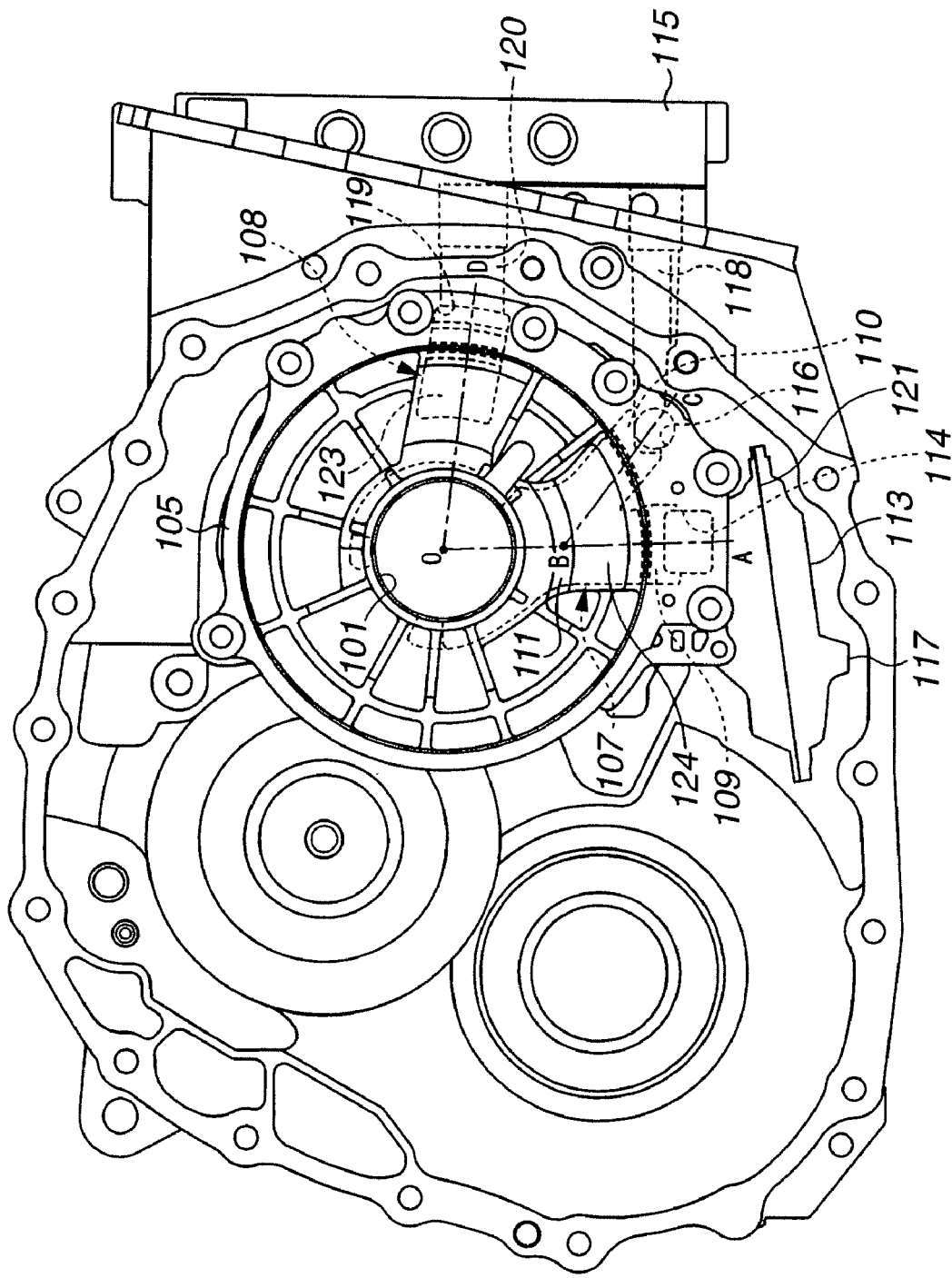
FIG. 3 is an axial view of the transmission mechanism of the automatic transmission from the torque-converter side, showing the detailed fluid passage structure of the oil pump of the embodiment.

As seen in FIG. 3, according to the oil pump structure of the embodiment, the oil inflow port structure, that is, first and second inflow ports 114 and 116 (described later), is formed in the outside surface of the outer peripheral portion of pump cover 105, facing transmission mechanism 11. The reason for this (inflow ports 114 and 116 formed in the outside surface of pump cover 105 and facing transmission mechanism 11) is that an oil strainer 113 and a control valve 115 are both installed near the circumference of transmission mechanism 11 for efficient connection or easy fitting between the first inflow port 114 and strainer 113 and for efficient connection or easy fitting between the second inflow port 116 and control valve 115.

Hereinafter described in reference to FIGS. 3-6 is the detailed fluid-flow passage structure of oil pump 100. As seen in FIGS. 3-6, oil pump 100 has a hydraulic pressure chamber 101, first inflow port 114, second inflow port 116, and a suction passage 107. Hydraulic pressure chamber 101 is formed as a central cylindrical-hollow pumping chamber, which is coaxial with the rotation axis of the pump and has a short axial length (a narrow axial dimension). The first inflow port 114 communicates with strainer 113 to introduce oil into hydraulic pressure chamber 101. The second inflow port 116 communicates with control valve 115 through an oil passage 118. Suction passage 107 communicates with each of the first and second inflow ports 114 and 116, and hydraulic pressure chamber 101. Oil pump 100 has a discharge passage 108 so as to deliver part of oil from hydraulic pressure chamber 101 into control valve 115 for engagement (application) or disengagement (release) of each of friction elements of the automatic transmission, such as clutches and band brakes, and to deliver the remaining oil from hydraulic pressure chamber 101 into lubricated portions for lubrication of sliding/moving transmission parts with lubricating oil.

As best seen in FIG. 3, suction passage 107 and discharge passage 108 are configured or formed in such a manner as to extend in the substantially radial direction of oil pump 100.

Suction passage 107 is comprised of a first suction passage 109, a second suction passage 110, a third suction passage 111, and a fourth suction passage 112. On the other hand, discharge passage 108 is comprised of a first discharge passage 122 and a second discharge passage 123.

Oil strainer 113 is located nearby the outer circumference of transmission mechanism 11 rather than torque converter 3.

In the oil pump structure of the embodiment, note that oil strainer 113 is directly installed only on oil pump 100 (exactly, mounted on pump cover 105). Generally, such an oil strainer is often installed on a transmission case. Thus, the installation structure of oil strainer 113 is characteristic of the oil pump structure of the embodiment. However, oil strainer 113 itself is a well-known oil strainer. Oil strainer 113 has an oil suction port (an inlet port) 117 formed at its bottom end, an oil discharge port (an outlet port) 125 formed at its upper end portion, and an internal oil filter 121 placed midway between suction port 117 and discharge port 125 and formed usually as a wire-mesh screen for preventing dirt and debris and other harmful solid objects and particles from entering the oil pump. The filtered-out oil is discharged from discharge port 125 formed at the upper portion of strainer 113 into oil pump 100.

In a similar manner to oil strainer 113, control valve 115 is located nearby the outer circumference of transmission mechanism 11 rather than torque converter 3.

Figure 4:
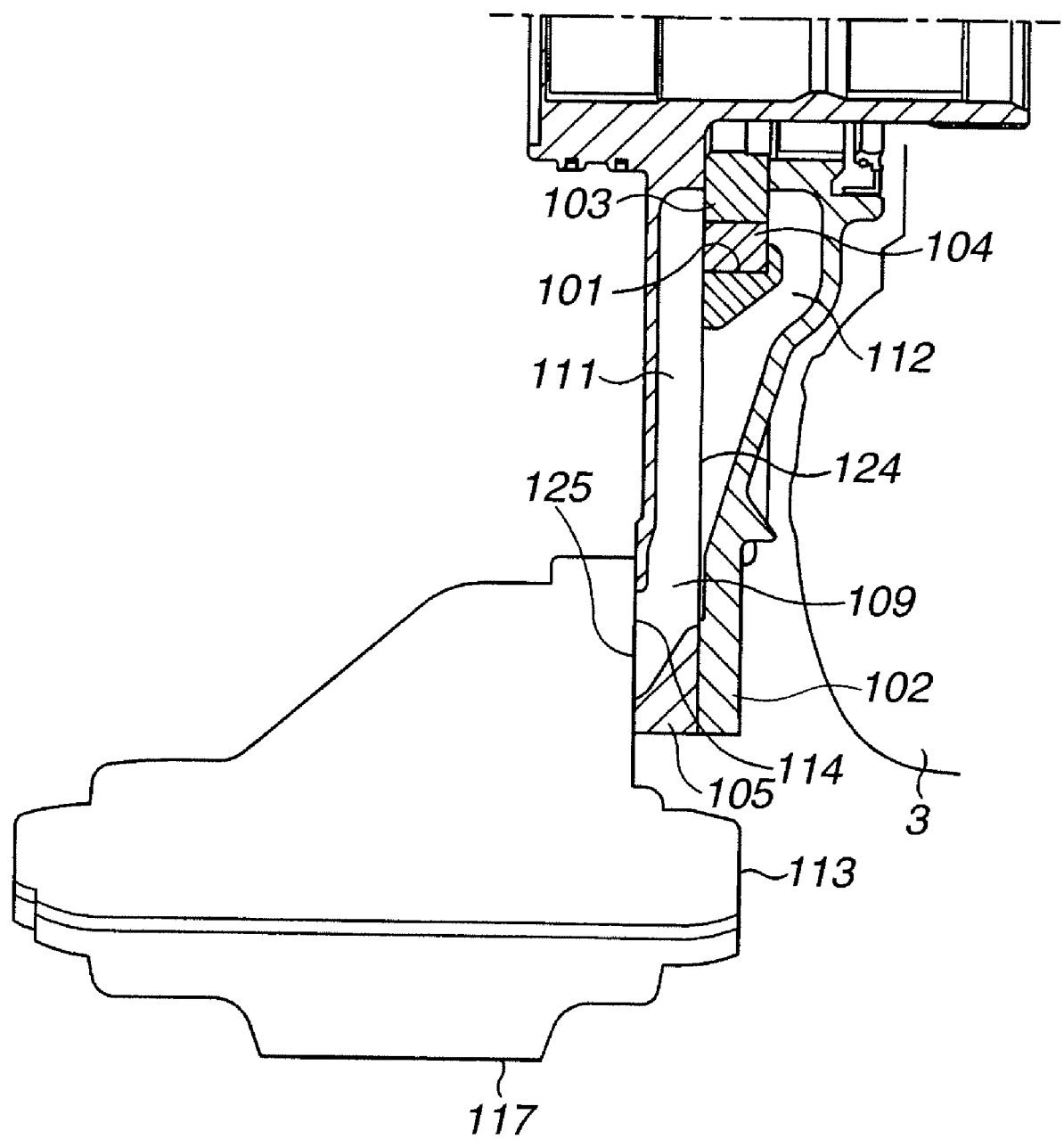
FIG. 4 is a cross-sectional view taken along the line O-A in FIG. 3.
Figure 5:
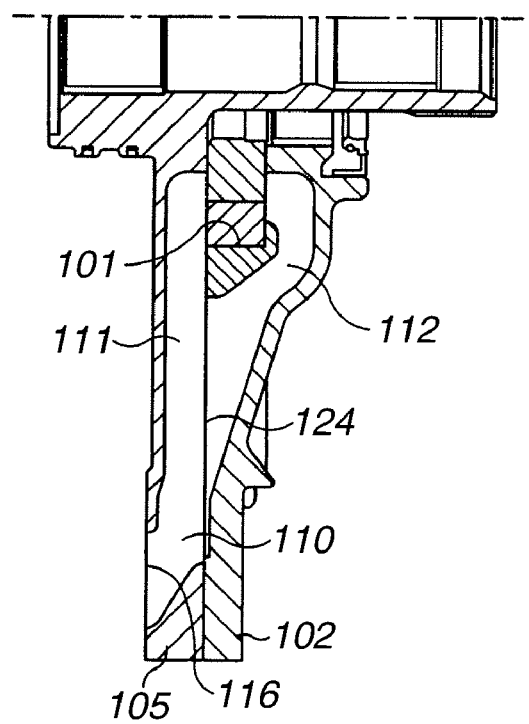
FIG. 5 is a cross-sectional view taken along the line O-B-C in FIG. 3.

As shown in FIGS. 3 and 4, the first inflow port 114 is formed near the circumference of pump cover 105 and opened from the outside wall surface (the left-hand sidewall surface in FIG. 4) of pump cover 105, facing transmission mechanism 11 rather than torque converter 3. The first suction passage (the first oil inflow passage) 109 is connected to the first inflow port 114. As shown in FIGS. 3 and 5, in a similar manner to the first inflow port 114, the second inflow port 116 is formed near the circumference of pump cover 105 and opened from the outside wall surface (the left-hand sidewall surface in FIG. 5) of pump cover 105, facing transmission mechanism 11. The second suction passage (the second oil inflow passage) 110 is connected to the second inflow port 116.

Furthermore, as can be seen from the cross sections of FIGS. 4-5, the upstream portions of the first and second suction passages 109-110 are formed only in pump cover 105, but the downstream portions of the first and second suction passages 109-110 are formed or bored in pump housing 102 as well as pump cover 105, such that a grooved portion (or a left-hand side recessed half in FIG. 4) formed in pump cover 105 and radially extending toward hydraulic pressure chamber 101 and a grooved portion (or a right-hand side recessed half in FIG. 4) formed in pump housing 102 and radially extending toward hydraulic pressure chamber 101 are joined together to define the integrated suction passage (the integrated suction channel) in pump cover 105 and pump housing 102 integrally connected with each other. Thus, regarding the downstream portions of the first and second suction passages 109-110, as can be appreciated from the longitudinal cross-sectional views of FIG. 4-5, it is possible to ensure a large flow passage area in the axial direction of oil pump 100.

Although it is not clearly shown in FIGS. 3-5, a leakproof oil seal is interleaved at the connected portion (or the joined portion) of oil strainer 113 and the first inflow port 114 of pump cover 105, while a leakproof oil seal is interleaved at the connected portion (or the joined portion) of the second inflow port 116 of pump cover 105 and oil passage 118 connected to control valve 115.

As clearly shown in FIGS. 3-5, the first and second suction passages 109-110 are merged or combined with each other at their downstream portions to provide a merged-flow portion (or a combined-flow portion or a confluent portion) 124. The third suction passage (the downstream-side oil distribution channel) 111 and the fourth suction passage (the downstream-side oil distribution channel) 112 are formed downstream of the above merged-flow portion 124. The downstream ends of the third and fourth suction passages 111-112 are both communicated with hydraulic pressure chamber 101. As can be seen from the angle ∠ABC (less than 90 degrees) indicated in FIG. 3, that is, the angle between the line O-A (or the line B-A) and the line B-C, the first and second suction passages 109 and 110 are merged with each other to make an acute angle less than a right angle. In other words, the angle between the flow direction (the suction direction) of oil flowing through the first suction passage 109 and the flow direction (the suction direction) of oil flowing through the second suction passage 110 is acute.

As best seen in FIGS. 4-5, in the oil pump structure of the shown embodiment, the third suction passage 111 is formed in pump cover 105, while the fourth suction passage 112 is formed in pump housing 102. Additionally, the upstream portions of the third and fourth suction passages 111-112 are formed as an integrated suction passage (an integrated suction channel) with no partition (without any boundary). On the contrary, the downstream portions of the third and fourth suction passages 111-112 are branched or separated from each other, such that the downstream end of the third suction passage 111 is communicated with hydraulic pressure chamber 101 from a first axial end (the left-hand sidewall face in FIGS. 4-5) of hydraulic pressure chamber 101 and that the downstream end of the fourth suction passage 112 is communicated with hydraulic pressure chamber 101 from the second axial end (the right-hand sidewall face in FIGS. 4-5) of hydraulic pressure chamber 101.

The central portion of pump housing 102, defining therein hydraulic pressure chamber 101 in conjunction with pump cover 105 hermetically covering the pumping chamber, is axially enlarged and projected toward the adjacent torque converter 3. Thus, the central portion of pump housing 102 is configured to have a comparatively large axial thickness (a comparatively large axial length). On the contrary, the outer peripheral portion of pump housing 102 is not axially enlarged toward torque converter 3. Thus, the outer circumference of pump housing 102 is formed as a comparatively thin-walled section in the axial direction of oil pump 100. As can be appreciated, the setting of the shape of pump housing 102 is determined or designed to substantially conform to the shape (the outline) of torque converter 3 in close vicinity to pump housing 102.

In other words, the outer peripheral portion of torque converter 3 is formed as an axially backward-curved portion enlarged and projected toward the adjacent pump housing 102. The central portion of torque converter 3 is not axially enlarged toward pump housing 102. For the reasons discussed above, it is possible to efficiently arrange pump housing 102 in the axially limited space by determining or designing the shape of pump housing 102 in such a manner as to substantially conform to the shape (the outline) of the adjacent torque converter 3.

Fully taking into account the substantially cone-shaped pump housing 102 substantially conforming to the shape (the outline) of the adjacent torque converter 3, the fourth suction passage 112 has a comparatively large axial thickness (a comparatively large axial length) at the central portion of pump housing 102 near hydraulic pressure chamber 101, and has a comparatively small axial thickness (a comparatively small axial length) or zero axial thickness (there is no formation of the fourth suction passage 112) at the outer peripheral portion of pump housing 102 near the circumference of pump housing 102. Even when the axial thickness (axial length) of the fourth suction passage 112 at the merged-flow portion 124 and nearby the circumference of pump housing 102 is dimensioned to be comparatively small, this section is actually configured or formed as the integrated suction passage (the integrated suction channel) that the third and fourth suction passages 111-112 are combined with each other. Thus, it is possible to ensure the adequate flow passage area in the axial direction of oil pump 100.

In the oil pump structure of the embodiment, the summed value of the flow passage area of the third suction passage 111 and the flow passage area of the fourth suction passage 112 is dimensioned to be greater than or equal to the summed value of the flow passage area of the first inflow port 114 (or the flow passage area of the first suction passage 109) and the flow passage area of the second inflow port 116 (or the flow passage area of the second suction passage 110). In other words, the flow passage area of the downstream side of merged-flow portion 124 is dimensioned to be greater than or equal to the summed value of the flow passage areas of the first and second inflow ports 114 and 116.

Figure 6:
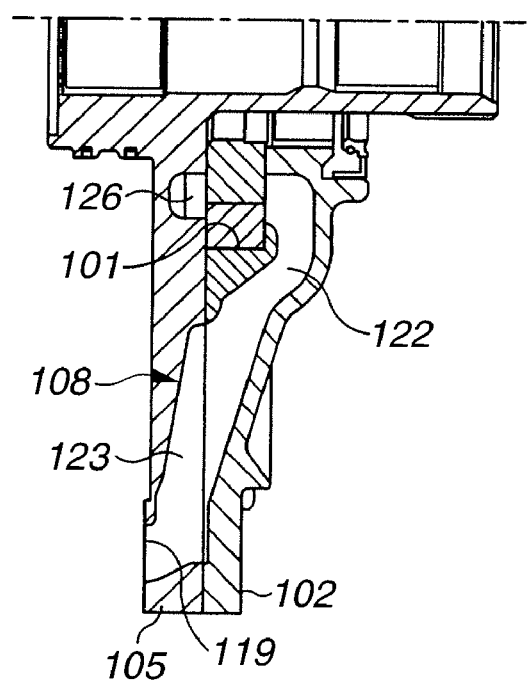
FIG. 6 is a cross-sectional view taken along the line O-D in FIG. 3.

On the other hand, as shown in FIGS. 3 and 6, the radially-extending discharge passage 108 is formed in pump housing 102 as well as pump cover 105. In more detail, discharge passage 108 is comprised of the first discharge passage 122 formed in pump housing 102 and the second discharge passage 123 formed in pump cover 105. The upstream end of discharge passage 108 communicates with hydraulic pressure chamber 101, whereas the downstream end of discharge passage 108 extends to communicate with an oil discharge port 119 formed in the outer circumference of the oil pump. The upstream portion of discharge passage 108, communicating with hydraulic pressure chamber 101, is formed only by the first discharge passage 122. In contrast, the downstream portion of discharge passage 108, communicating with discharge port 119, is formed as the integrated discharge passage (the integrated discharge channel) that the first and second discharge passages 122-123 are combined with each other.

As set forth above, the upstream portion of discharge passage 108 is formed only in pump housing 102, while the downstream portion of discharge passage 108 is formed in both of pump housing 102 and pump cover 105. This reason for this is that, in order to produce an adequate pump discharge pressure, it is very effective to discharge working oil through only one axial end face (the right-hand sidewall face in FIG. 6) of hydraulic pressure chamber 101. In particular, pump housing 102 is configured or formed at its central portion surrounding hydraulic pressure chamber 101 with an axially thick-walled section, and thus an outlet of pressurized working oil from hydraulic pressure chamber 101 is formed only in pump housing 102.

In the same manner as the third and fourth suction passages 111-112, both constructing part of suction passage 107, regarding a portion of pump housing 102, defining therein discharge passage 108, the outer circumference of pump housing 102 is formed as a comparatively thin-walled section in the axial direction of oil pump 100, such that pump housing 102 is shaped or dimensioned to substantially conform to the shape (the outline) of the adjacent torque converter 3. However, it is difficult to ensure the adequate cross section of discharge passage 108 in the axial direction of oil pump 100 only by means of pump housing 102. Additionally, discharge port 119 itself is formed in pump cover 105. For the reasons discussed above, the downstream portion of discharge passage 108 is formed in pump housing 102 as well as pump cover 105.

As seen in FIG. 6, a pressure-balance hydraulic pressure chamber 126 (simply, a pressure-balance chamber) is formed in pump cover 105 to face the first axial end of hydraulic pressure chamber 101 (i.e., on the left-hand sidewall face of hydraulic pressure chamber 101 faced apart from the first discharge passage 122 in FIG. 6). Pressure-balance chamber 126 is provided to balance hydraulic pressure (i.e., hydraulic pressure in the first discharge passage 122) applied to the second axial end face (the right-hand sidewall face in FIG. 6) of each of inner and outer rotors 103-104 accommodated in hydraulic pressure chamber 101 and hydraulic pressure (i.e., hydraulic pressure in pressure-balance chamber 126) applied to the first axial end face (the left-hand sidewall face in FIG. 6) of each of inner and outer rotors 103-104 by introducing the pressurized working oil from hydraulic pressure chamber 101 into pressure-balance chamber 126, thereby stabilizing the behavior (the operation) of each of inner and outer rotors 103-104, and suppressing a wearing loss of these rotors 103-104 during operation of oil pump 100.

According to the oil pump structure of automatic transmission 1 of the embodiment constructed as previously described, when pump impeller 3a of torque converter 3 is rotated in synchronism with rotation of the crankshaft of engine 2, inner rotor 103, which is connected to pump impeller hub 106 integrally connected to or formed with pump impeller 3a, is rotated. Rotation of inner rotor 103 causes outer rotor 104 to turn also. During rotary motion of inner and outer rotors 103-104, pumping action is made by way of a change in volumetric capacity in the clearance space (the gaps between the teeth) defined between the outer toothed portion of inner rotor 103 and the inner toothed portion of outer rotor 104.

Working oil introduced via suction passage 107 into hydraulic pressure chamber 101 is pressurized by the pumping action of oil pump 100. Then, the pressurized working oil is supplied through discharge passage 108 and an oil passage 120 into control valve 115. The working oil (hydraulic pressure), which is delivered through oil passage 120 into control valve 115, is used to drive each of various control valves (containing solenoid valves) accommodated in the control-valve body and also used as lubricating oil for each of the friction elements. Oil used for lubrication of each of the friction elements returns to the oil pan and stored therein. The working oil stored in the oil pan is introduced through oil strainer 113 and the first inflow port 114 into the first suction passage 109 by way of the pumping action of oil pump 100. The working oil, which is drained from control valve 115 and has the residual pressure, is introduced through oil passage 118 and the second inflow port 116 into the second suction passage 110.

The working oil introduced into the first suction passage 109 and the working oil introduced into the second suction passage 110 are merged or combined with each other at the merged-flow portion 124 formed or defined in pump housing 102 and pump cover 105. The merged working-oil flow is supplied into hydraulic pressure chamber 101, and re-pressurized by way of pumping action and discharged again into the discharge passage 108.

In the structure of oil pump 100 of the embodiment capable of operating as discussed above, the outside diameter of pump housing 102 and the outside diameter of pump cover 105 are dimensioned to be substantially identical to each other. And thus, only by fastening the outer peripheral portions of pump housing 102 and pump cover 105 with pump-cover-and-pump-housing attaching bolts, it is possible to easily secure and integrally connect pump housing 102 and pump cover 105, and additionally to provide metal-to-metal sealing surfaces, which form a virtually leakproof seal without using any oil seals, for example, O-ring seals. This design is superior in the ease of assembly and the enhanced sealing performance, and eliminates the necessity of oil seals to be interleaved between pump housing 102 and pump cover 105. This contributes to the lower system installation time and costs, and reduced axial size of the pump.

Additionally, according to the oil pump structure of the embodiment, the axial length of the outer peripheral portion of pump housing 102 is properly reduced or limited such that the dimensional outline (the outside dimension) of pump housing 102 is configured to substantially conform to that of the adjacent torque converter 3. Thus, each of the fourth suction passage 112 (see FIGS. 4-5) and the first discharge passage 122 (see FIG. 6) has a comparatively small axial dimension or zero axial dimension at the outer circumference of pump housing 102. However, near the circumference of the pump-cover-and-pump-housing assembly (the integrated pump members 102 and 105), the fluid-flow passage space of each of suction passage 107 and discharge passage 108 is shared mainly on pump cover 105 rather than pump housing 102. Thus, it is possible to avoid pump housing 102 from being interfered with the adjacent torque converter 3, while ensuring the required space of each of suction passage 107 and discharge passage 108. Owing to the properly shared passage space between pump housing 102 and pump cover 105, it is possible to effectively suppress the total axial dimension of oil pump 100, while ensuring the adequate flow passage area in the axial direction of oil pump 100. This also contributes to a compactification of overall automatic transmission system employing oil pump 100 interposed between torque converter 3 and transmission mechanism 11. This achieves smaller space requirements of overall automatic transmission system. The compact transmission system allows excellent mountability.

Furthermore, according to the oil pump structure of the embodiment, working oil fed from oil strainer 113 is introduced into the first suction passage (the first oil inflow passage) 109 (see FIG. 4), whereas working oil drained from control valve 115 is introduced into the second suction passage (the second oil inflow passage) 110 (see FIG. 5). The first and second suction passages 109-110 are merged or combined with each other at the merged-flow portion 124 defined in both of pump housing 102 and pump cover 105. The merged working-oil flow is supplied through the third and fourth suction passages 111-112 into hydraulic pressure chamber 101. The integrated suction passage structure constructed by a portion of the third suction passage 111 after merging (downstream of merged-flow portion 124) and a portion of the fourth suction passage 112 after merging (downstream of merged-flow portion 124) effectively utilizes the central portion of pump housing 102 having a comparatively large axial length. And thus, it is possible to set the working-oil flow passage area after merging as wide as possible. This effectively suppresses or avoids the working-oil flow velocity after merging from being increased, thus avoiding a fall in pump discharge pressure, which may occur due to the increased flow velocity after merging, and suppressing air from being sucked into the interior space of pump 100 through the oil-seal retaining grooves, and also suppressing the generation of noise occurring due to the sucked air.

Moreover, according to the oil pump system of the embodiment, oil strainer 113 is installed on oil pump 100 from the side of the oil pump assembly opposite to torque converter 3. Thus, it is possible to efficiently install oil strainer 113 within the limited peripheral space of the automatic transmission, without interfering with torque converter 3.

In the shown embodiment, actually, oil strainer 113 is installed only on pump cover 105 of oil pump 100. The installation structure of oil strainer 113 is simple, but it is difficult to ensure a high bearing pressure of the fitted surface between oil strainer 113 and oil pump 100, since strainer 113 is installed on pump cover 105 rather than transmission case 10. However, according to the oil pump structure of the embodiment, as set out above, working oil from oil strainer 113 and working oil from control valve 115 are merged or combined with each other at the merged-flow portion 124. Thus, it is possible to prevent or suppress an increase in the flow velocity of working oil flowing through the fitted portion between oil strainer 113 and oil pump 100, and whereby it is possible to lower the required bearing pressure (or the design bearing pressure) of the fitted surface between oil strainer 113 and oil pump 100. Thus, even in the case of the previously-noted oil strainer installation structure (oil strainer 113 installed only on pump cover 105), there is no malfunction of the oil pump system, and there is no risk of oil leakage from the fitted surface between strainer 113 and pump cover 105, thus avoiding the problem of air sucked into the pump.

Additionally, according to the oil pump structure of the embodiment, the angle between the flow direction (the suction direction) from the upstream end of the first suction passage 109 to the merged-flow portion 124 and the flow direction (the suction direction) from the upstream end of the second suction passage 110 to the merged-flow portion 124 is dimensioned to be acute (less than a right angle). Thus, it is possible to efficiently merge or combine the working oil introduced through oil passage 118 and the second inflow port 116 into the second suction passage 110 with the working oil introduced through oil strainer 113 and the first inflow port 114 into the first suction passage 109, while minimizing a loss of the residual pressure of working oil drained from control valve 115. That is to say, by virtue of the previously-discussed acute-angle merged-flow portion 124, the merged working-oil flow can be efficiently smoothly supplied or introduced into hydraulic pressure chamber 101.

Furthermore, according to the oil pump structure of the embodiment, the downstream end of the third suction passage 111 is communicated with the first axial end (the left-hand sidewall face in FIGS. 4-5) of hydraulic pressure chamber 101, while the downstream end of the fourth suction passage 112 is communicated with the second axial end (the right-hand sidewall face in FIGS. 4-5) of hydraulic pressure chamber 101. Therefore, it is possible to realize working-oil supply from both sides of hydraulic pressure chamber 101, thereby enhancing the charging efficiency of working oil into hydraulic pressure chamber 101.

As will be appreciated from the above, according to the oil pump structure of the transmission of the embodiment, the first working oil delivered from the oil strainer is introduced via the first inflow port into the pumping chamber, while the second working oil drained from the control valve is introduced via the second inflow port separated from and spaced apart from the first inflow port into the pumping chamber. Thus, it is possible to certainly avoid the first and second working oils from being merged with each other in close vicinity to each of the first and second inflow ports. The merged-flow portion is formed in the pump body (the pump housing with the cover) without reducing or shrinking the flow passage area of the merged-flow portion, thus preventing an undesirable rise in flow velocity at the merged-flow portion. As a result of this, it is possible to prevent or avoid a deterioration of fuel economy, i.e., an increase in fuel consumption rate. Also, it is possible to suppress air from being sucked into the interior space of the pump through the oil-seal retaining grooves of the fitting portions between the first inflow port of the oil pump and the oil strainer and between the second inflow port of the oil pump and the control valve. Thus, it is possible to suppress a drop in hydraulic pressure (i.e., a pump discharge pressure fall) and noise occurring owing to the sucked air. Additionally, the properly tuned and suppressed flow velocity after merging contributes to the reduced cross section of each of the previously-noted fitting portions, thus ensuring an adequate sealing performance of each of the fitting portions. This eliminates such a countermeasure that the pitch between two adjacent fastening bolts must be narrowed to provide a high sealing performance.

Therefore, it is possible to reduce the number of fastening bolts and to ensure lower system installation time and costs.

In particular, the flow passage area of the downstream side of the merged-flow portion is dimensioned to be greater than or equal to a summed value of flow passage areas of the first and second inflow ports. Thus, it is possible to more certainly prevent a rise in flow velocity at the merged-flow portion.

Additionally, the downstream-side oil distribution channel, communicating with the downstream side of the merged-flow portion, is formed as an integrated channel in both of the pump housing and the pump cover, so that the downstream-side oil distribution channel extends over both of the pump housing and the pump cover. Thus, it is possible to ensure the adequate flow passage area of the downstream-side oil distribution channel, communicating with the downstream side of the merged-flow portion, while suppressing the axial length of the pump.

Furthermore, the pump housing is located in close vicinity to the torque converter of the transmission. Thus, it is possible to provide an efficient connecting structure and efficient layout between the oil pump rotor (the inner rotor) and the pump impeller of the torque converter. Additionally, as previously discussed, the downstream-side oil distribution channel, communicating with the downstream side of the merged-flow portion, is formed as the integrated channel in both of the pump housing and the pump cover. Thus, it is possible to certainly provide the adequate flow passage area of the downstream-side oil distribution channel in the axially limited space, without enlarging the axial length of the pump housing.

Moreover, at the merged-flow portion, the first and second oil inflow passages are merged with each other at an acute angle. It is possible to relax or soften undesirable interference (collision or impingement) between the working oil flow introduced through the first inflow port and the working oil flow introduced through the second inflow port. In particular, the working oil drained from the control valve can be efficiently smoothly merged with the working oil from the oil strainer without losing the residual pressure of the working oil from the control-valve body. Thus, it is possible to more efficiently deliver working oil from both of the oil strainer and the control valve into the pumping chamber while reducing the undesired energy loss.

In the shown embodiment, the merged-flow portion 124 of the first and second suction passages 109-110 is formed or defined in both of pump housing 102 and pump cover 105. In other words, the upstream end of the third suction passage 111 and the upstream end of the fourth suction passage 112 are combined with each other and formed as the merged-flow portion 124. In lieu thereof, the merged-flow portion 124 may be formed or provided only in pump housing 102 (i.e., the fourth suction passage 112). Alternatively, the merged-flow portion 124 may be formed or provided only in pump cover 105 (i.e., the third suction passage 111).

In the shown embodiment, oil pump 100 used in the transmission is constructed by an internal gear pump, which is an eccentric-rotor type pump composed of inner and outer rotors. The number of teeth of the inner toothed portion of outer rotor 104 is designed or set to the summed value of the number of teeth of the outer toothed portion of inner rotor 103 and "1". The oil pump structure of the embodiment may be applied to another type of internal gear pump, for example, a crescent-shaped-seal type internal gear pump composed of inner and outer gears meshing with each other, and a stationary crescent-shaped seal, which is part of the pump housing.

The entire contents of Japanese Patent Application No. 2006-083147 (filed Mar. 24, 2006) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An oil pump structure of a transmission comprising:
a pump housing installed on the transmission and having a hydraulic pressure chamber;
inner and outer rotors rotatably accommodated in the hydraulic pressure chamber; and
a pump cover attached to the pump housing for hermetically covering the hydraulic pressure chamber formed in the pump housing to hold the inner and outer rotors in the pump housing,
wherein a first inflow port communicating with an oil strainer and a second inflow port communicating with a control valve are formed in an outside surface of the pump cover separately from each other,
wherein a first oil inflow passage communicating with the first inflow port and a second oil inflow passage communicating with the second inflow port, a merged-flow portion configured such that a downstream portion of the first oil inflow passage and a downstream portion of the second oil inflow passage are merged with each other, and a downstream-side oil distribution channel intercommunicating a downstream side of the merged-flow portion and the hydraulic pressure chamber, are formed in at least one of the pump housing and the pump cover, and
wherein a flow passage area of the downstream side of the merged-flow portion is dimensioned to be greater than or equal to a summed value of flow passage areas of the first and second inflow ports.

2. The oil pump structure as claimed in claim 1, wherein:
the downstream-side oil distribution channel, communicating with the downstream side of the merged-flow portion, is configured as an integrated channel formed in both of the pump housing and the pump cover.

3. The oil pump structure as claimed in claim 1, wherein:
the pump housing is located in close vicinity to a torque converter of the transmission.

4. The oil pump structure as claimed in claim 1, wherein:
the first and second oil inflow passages are merged with each other at an acute angle at the merged-flow portion.

5. The oil pump structure as claimed in claim 4, wherein:
an angle between a flow direction of working oil flowing through the first oil inflow passage and a flow direction of working oil flowing through the second oil inflow passage is acute.

6. The oil pump structure as claimed in claim 1, wherein:
an outside diameter of the pump housing and an outside diameter of the pump cover are dimensioned to be substantially identical to each other; and
an outer circumference of the pump housing and an outer circumference of the pump cover are bolted together to provide metal-to-metal sealing surfaces forming a virtually leakproof seal.

* * * * *